Patented Apr. 8, 1930

1,753,395

UNITED STATES PATENT OFFICE

FREDERIC WILKES, OF WILKINSBURG, PENNSYLVANIA

CLEANING COMPOUND

No Drawing.    Application filed April 5, 1928.    Serial No. 267,797.

My invention relates to cleaning compounds, and more particularly to those partaking of the character of cleaning solutions and water softeners.

One object of my invention is to provide a solution in the form of liquid cleaner which may be added to water employed for scrubbing or other cleaning operations, and which will also serve as a softener, which will be non-irritant to the hands of the user, and which will not become solidified or produce sediment.

Another object of my invention is to provide a cleaning and water-softening compound possessing improved characteristics generally.

One mixture which I may employ with satisfactory results is composed of

|  | Per cent |
|---|---|
| Silicate of soda | 33 |
| Saturated borax water | 66 |
| Ammonia | 1 |

Still another formula may be stated as follows:

|  | Parts |
|---|---|
| Silicate of soda | 33⅓ |
| Water | 66⅔ |
| Borax | 2⅔ |
| Ammonia | 3 |

In making this cleaning solution, I first mix the water with the borax, with the water at a temperature of between 35 and 50 degrees centigrade. Thereafter, the ammonia is thoroughly stirred into the borax water. This mixture is then quickly stirred into the silicate of soda. I find this procedure to be desirable in that, if the silicate of soda is incorporated before the borax water and ammonia are mixed, or if the silicate of soda is mixed into the borax water, a precipitate will likely result. An excess quantity of borax in the borax water will cause the liquid to form a jelly-like mass, so that substantially the foregoing method of mixing must be maintained in order that the cleaner will be in the form of a liquid, instead of a solid.

The concentrated solution above-described is preferably employed by adding one part of said solution to ten parts of water, for ordinary cleaning purposes, as when cleaning painted walls. I find that the mixture described is quite effective in cleaning walls, and that there is little or no danger of streaking, so that instead of commencing cleaning operations at the bottom of a wall and working upwardly, I am enabled to commence washing at the top of the wall and work downwardly, since the streams of water which flow down the wall will not leave streaks after the wall has been cleaned, as in the case of various other cleaning agents. The compound is also suitable for cleaning rugs, tapestries, woodwork, the hands of mechanics, etc.

For some purposes, a tablespoonful of the solution will be sufficient for addition to one gallon of water, as for bathing purposes, washing dishes, and washing clothes.

I claim as my invention:—

A cleaning compound containing approximately

|  | Per cent |
|---|---|
| Silicate of soda | 33 |
| Saturated borax water | 66 |
| Ammonia | 1 |

In testimony whereof I, the said FREDERIC WILKES, have hereunto set my hand.

FREDERIC WILKES.